Nov. 2, 1937.  W. H. BELL  2,098,129
LOADED AND LIGHT CAR BRAKE
Filed April 1, 1937
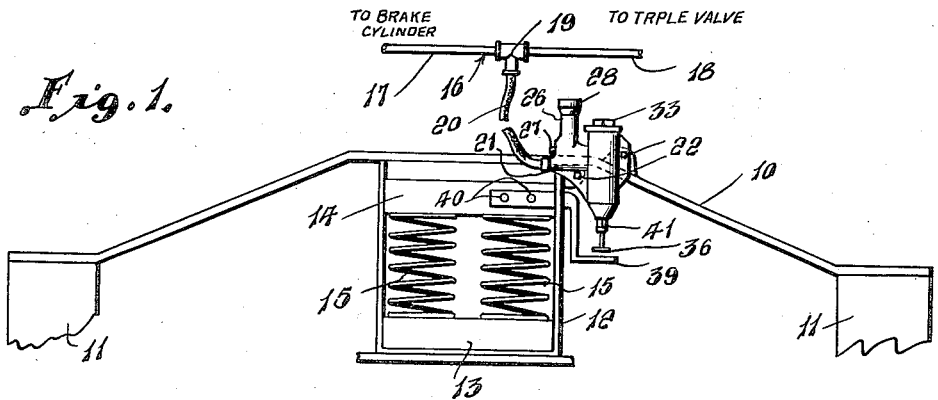
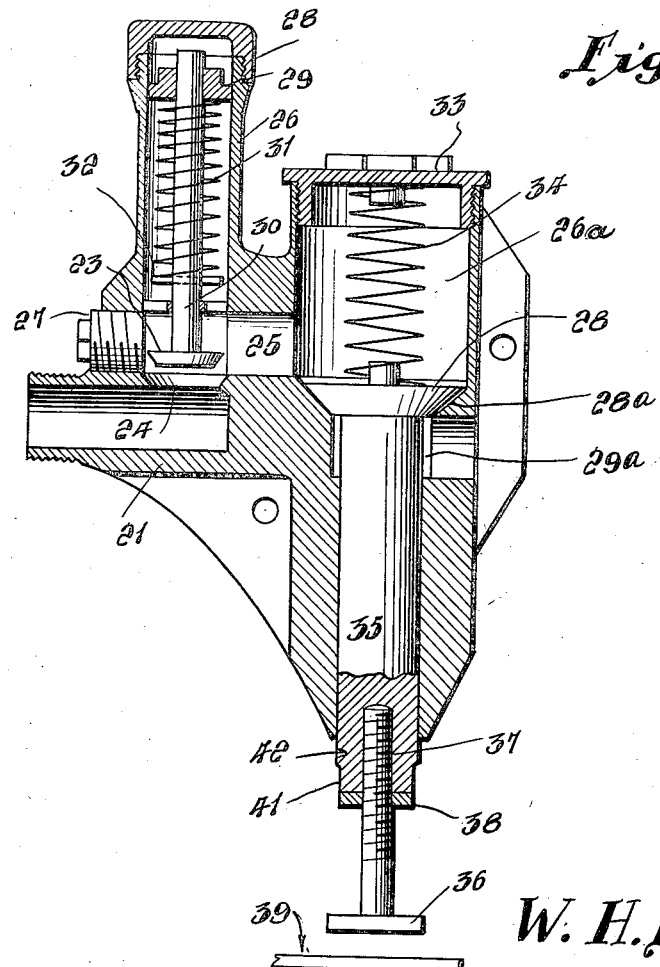
Inventor
W. H. Bell
By L. F. Laudreth
Attorney Patented Nov. 2, 1937

2,098,129

UNITED STATES PATENT OFFICE 2,098,129

LOADED AND LIGHT CAR BRAKE

Wright H. Bell, Oneonta, N. Y.

Application April 1, 1937, Serial No. 134,410

4 Claims. (Cl. 303—22)

This invention relates to a braking mechanism for railway cars and particularly heavy duty freight cars.

It is aimed to provide a novel construction which is exceedingly efficient for loaded cars and light cars, that is usually empty cars. It is especially aimed to provide a construction or equipment which is inexpensive as concerns initial installation, a construction having parts not likely to get out of order, a construction entirely automatic in operation and a construction which is readily adjustable and may be used as an attachment in existing air brake systems.

The more specific objects and advantages will be pointed out hereinafter in part and otherwise become apparent from a consideration of the description following taken in connection with accompanying drawing illustrating an operative embodiment.

In said drawing:—

Figure 1 is a view showing my improvements applied in an air brake system as used on a freight car, and Figure 2 is an enlarged longitudinal sectional view through the valve parts of the invention.

Referring specifically to the drawing wherein like reference characters designate like or similar parts, a truck frame 10 of a freight car for instance is shown by way of example. Journal boxes for the wheel axles are shown at 11. Guides or jaws on the truck frame, as at 12, mount a lower or dead bolster 13 and an upper or live bolster 14, which as usual, is subject to the load of the freight car or the like. Cushioning coil springs 15 are interposed between the bolsters 13 and 14.

The invention is used in connection with the conventional air brake system of any type having a conduit 16, one end of which communicates with the air brake cylinder, and the other end of which 18 communicates with the triple valve. A T coupling 19 joins the pipes 17 and 18 and has a hose pipe 20 leading therefrom to a valve body 21 which is bolted or otherwise fastened in any suitable manner at 22 to the truck frame 10.

A poppet valve 23 co-acts with a seat 24 in a passage 25 within the body 21. About the poppet valve 23 is a cylinder 26 integral with body 21 and covered by a screw cap 28. 27 is a screw plug closing the end of passage 25. Spider 29 is located within the cylinder 26 and a stem 30 on the poppet valve slides through the spiders, and the stem is urged toward its seat 24 by an expansive coil spring 31 surrounding the stem 30, abutting the spider 29 at one end and a pin 32 carried by the stem 30, at the other end.

Passageway 25 communicates with a chamber 26ª in the body 21 at the base of which a seat 28ª is provided for engagement by a poppet valve 28, and which seat communicates with a port 29ª, in communication with the atmosphere. Chamber 26ª is closed at the top by a screw cap or plug 33 which is engaged by an expansive spring 34, also engaging the upper end of the poppet valve 28. A stem 35 depends from the poppet valve 28 and has a tappet 36 screw threaded thereto as at 37 for the proper clearance of valve 28 when the car is under a light load or empty.

Co-acting with the tappet 36, which is adjustable as shown, and preferably has a lock nut 38 associated therewith, is a bracket or striker plate 39, rigidly fastened at 40, to the live bolster 14.

It will be realized that the tension of the spring 31 is controlled so that the poppet valve 23 is set for the required predetermined amount of pressure in the brake cylinder for a light load, such as an empty car, any pressure in excess of the setting of such poppet valve 23, serving to raise the valve from its seat and to exhaust through the passage 25, valve seat 28ª and passage 29ª to the atmosphere. it being understood that normally the bracket 39 engages the tappet 36 and maintains the poppet valve 28 off of its seat.

However, when the car is under load, the live bolster 14 is subject to such load and will descend against the tension of the springs 15, thus moving the bracket 39 out of contact with the tappet 36 and enabling the latter to close under urgency of the spring 34. Such valve 28 thus closes the exhaust ports 29ª and whatever pressure is applied to the brake cylinder for the heavy duty brake will be retained. It will therefore be understood that when the exhaust port 29ª is closed the full pressure of air in the system is exerted to operate the brakes for a heavy load and when the port 29ª is open the brakes will be applied with a reduced pressure.

The present invention provides a duplex brake which is very desirable in the present day handling of heavy freight trains at high speed, for the added stopping power is very essential to quick stops, and prevention of slack action in freight trains is desirable because it causes so much damage to the equipment.

It will be realized that normally the bracket 39 engages the tappet 36 and maintains the valve 28 open and that when the bolster 14 descends under the weight of the load, it will move the bracket 29 away from the tappet 36, permitting the valve 28 to close under urgency of the spring 34.

It will be apparent that this invention is to be used in conjunction with the present braking system for one brake cylinder, now in cars, the heavy duty brake being obtained through a slight change in the hook up of the present system, while the light load brake is secured through installation of the duplex valve as described herein. The right to make changes in the design or shape of the valves to make them more adaptable to the purpose to be accomplished, within the scope of the claims included hereinafter and the spirit of the invention, is reserved.

The lower end of stem 35 is provided with a polygonal portion 41 for reception of a wrench in making adjustments and is also provided with a guide mark 41 for guidance of a shop man in making repairs.

Various changes may be resorted to provided they fall within the spirit and scope of the invention.

I claim as my invention:—

1. In combination with the air line of an air brake system of a vehicle, and a part displaceable according to the weight of a load, a valve operable to open under a predetermined pressure, a second valve, means on the part normally maintaining the second valve open, means providing communication with the atmosphere when the second valve is open, said second valve being closable through the displacement of said part under the weight of a load.

2. In combination with the air line of an air brake system of a vehicle, and a part displaceable according to the weight of a load, a valve operable to open under a predetermined pressure, a second valve, means on the part normally maintaining the second valve open, means providing communication with the atmosphere when the second valve is open, said second valve being closable through the displacement of said part under the weight of a load, a body mounting both of said valves, and spring means urging said valves to their seats.

3. In combination with the air line of an air brake system of a vehicle, and a part displaceable according to the weight of a load, a valve operable to open under a predetermined pressure, a second valve, means on the part normally maintaining the second valve open, means providing communication with the atmosphere when the second valve is open, said second valve being closable through the displacement of said part under the weight of a load, and an adjustable tappet on the second mentioned valve for co-action with said part.

4. In combination with the air line of an air brake system of a vehicle, and a live bolster, a device having a passage in communication with said line and with the atmosphere, said passage having first and second ports, a valve co-acting with the first port arranged to open on predetermined pressure, means on the live bolster engaging the second mentioned valve to maintain it open normally, means urging the second mentioned valve to its seat, and said means on the live bolster being disengageable with the second mentioned valve so that it may close, as the live bolster descends.

WRIGHT H. BELL.